Figure 1:
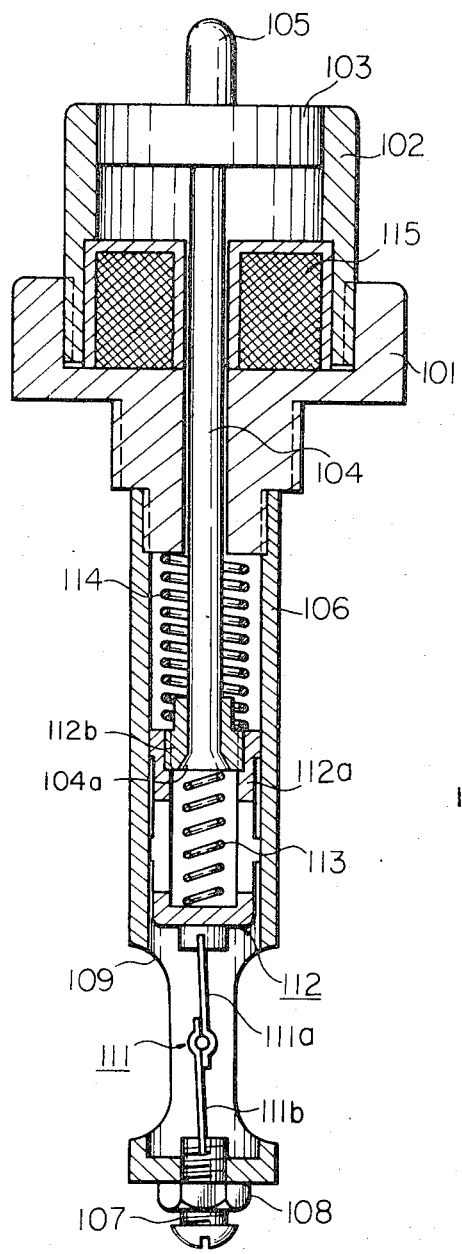

United States Patent

Mochida

[15] 3,672,386

[45] June 27, 1972

[54] FUSE MELT TYPE DAMPER DEVICE FOR INTERCEPTING FLOW THROUGH A DUCT

[72] Inventor: Hisashi Mochida, Suita, Japan

[73] Assignee: Daito Mfg. Co. Ltd., Osaka, Japan

[22] Filed: June 2, 1970

[21] Appl. No.: 42,828

[30] Foreign Application Priority Data

June 6, 1969 Japan..................................44/53069

[52] U.S. Cl............................................137/77, 126/287.5
[51] Int. Cl......................................F16k 17/38, F23n 3/04
[58] Field of Search......................................137/72-75, 77; 251/67; 98/1, 86; 126/287.5

[56] References Cited

UNITED STATES PATENTS

| | | | |
|---|---|---|---|
| 1,125,416 | 1/1915 | Watson | 137/72 X |
| 1,352,255 | 9/1920 | Emerson | 126/287.5 |
| 2,242,738 | 5/1941 | Alton | 126/287.5 |
| 2,287,262 | 6/1942 | Merry | 98/1 |
| 2,588,239 | 3/1952 | Hopton et al. | 126/287.5 X |
| 3,538,929 | 11/1970 | Botkin | 137/77 |

Primary Examiner—M. Cary Nelson
Assistant Examiner—Richard Gerard
Attorney—Milton J. Wayne

[57] ABSTRACT

An improved fuse melt type damper device used for a damper and capable of effecting interception of a flow medium through a conduit upon instruction from a remote control center in addition to a function of an automatic interception of the flow through detection of overheating of the medium.

8 Claims, 6 Drawing Figures

FUSE MELT TYPE DAMPER DEVICE FOR INTERCEPTING FLOW THROUGH A DUCT

The present invention relates to a fuse melt type damper device capable of intercepting a flow medium through a conduit duct upon instruction from a remote control center together with automatically intercepting the flow when the medium temperature becomes abnormally high.

It is known that a device is capable of intercepting the flow medium through a conduit when the overheating of the medium is detected by a fuse. However, in the actual process for flowing the medium through a conduit, there are oftentimes cases wherein the flow of the medium is required to be intercepted for several reasons. This is required, for example, when it becomes necessary to locationally isolate some flow line. In this connection, however, when damper mechanism in the prior art is used, automatic interception of the flow of the medium cannot be brought about unless the temperature of the medium become excessively high. In order to enable this interception of the flow line even when the temperature of the medium is normal, it has been necessary to disassemble the damper and its related mechanism and turn the damper so as to close the conduit manually. However, following the recent development of flow line systems, there is an intense requirement for automatic interception of the flow line by the instruction signals from the remote control center. The device of the present invention has been developed by the inventors of the present invention so as to meet, with satisfaction, this requirement for automatic interception of the flow line whenever required via instruction signals from a given remote control center.

The present invention has a principle object to provide an improved fuse melt type device for intercepting a flow of a medium through a conduit duct by instructions from a given control center, together with automatically intercepting the flow line when the temperature thereof becomes abnormally high.

Another object of the present invention is to provide an improved fuse melt type device having a very simple mechanical construction of a unit form resulting in considerable lowering of the manufacturing cost.

The fuse melt type device of the present invention is applied to a butterfly damper arrangement having a damper shaft extending into a duct through a duct wall in an axially pivotal disposition, a damper arm radially extending outside of the duct from the damper shaft and means for urging the damper shaft towards a pivotal angular position corresponding to a closing of the damper in a disposition operable on the damper shaft. The fuse-melt type device is provided with a fuse which is molten at a predetermined temperature of a fluid medium through the duct. One end of the fuse is secured to an internal extension of a stepped form from the duct wall and the fuse is exposed to a flow medium. A spring abutment is also provided, having an axial bore leading axially to only one opening, in an arrangement slidably inserted within the internal extension. Another end of the spring abutment, which is closed, is connected to a free end of the fuse. A piston member of a stepped form is also provided, slidably elongated within the internal extension through the duct wall. One end of the piston member is inserted slidably in the bore of the spring abutment through said opening in an arrangement to be prevented from getting out of said spring abutment, and another end of the spring abutment is used for detachable connection with the damper arm outside the duct wall. There is provided resilient means for urging the piston member remotely away from the fuse for the purpose of engaging with the damper. Means for urging the piston member towards the fuse against the urging force by the above-described resilient means upon instruction from a given remote control center for the purpose of disengaging from the damper arm is provided. Further resilient means for urging the spring abutment together with the piston member towards the fuse upon melting of the fuse is provided for the purpose of disengaging from the damper arm.

Figure 2:
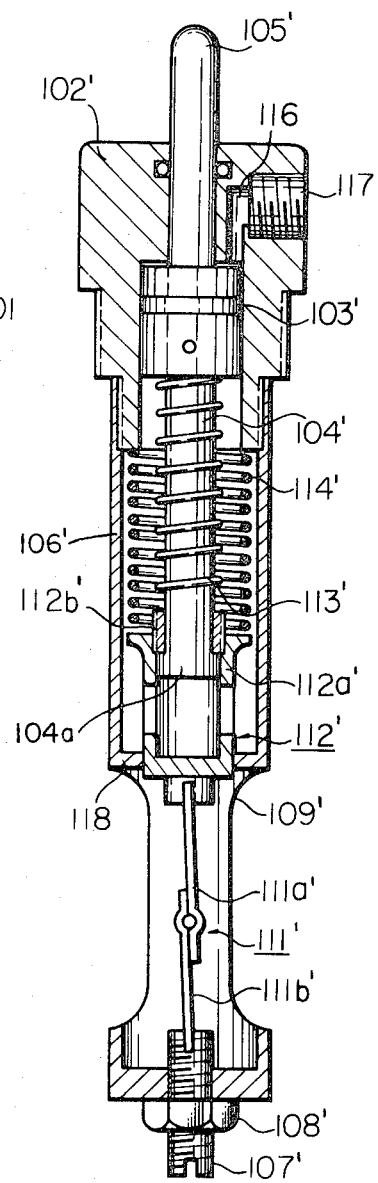
Figure 3:
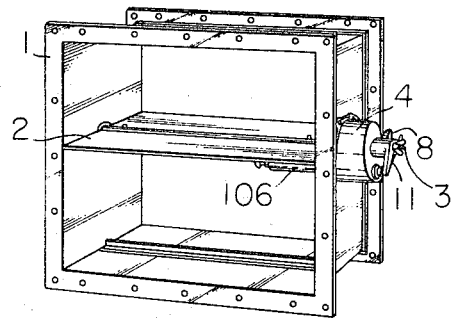
Figure 4:
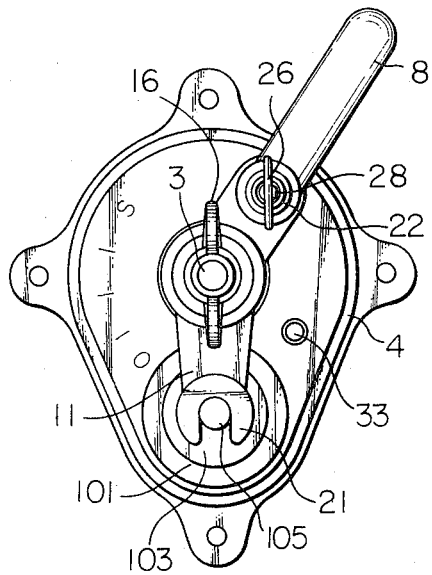
Figure 5:
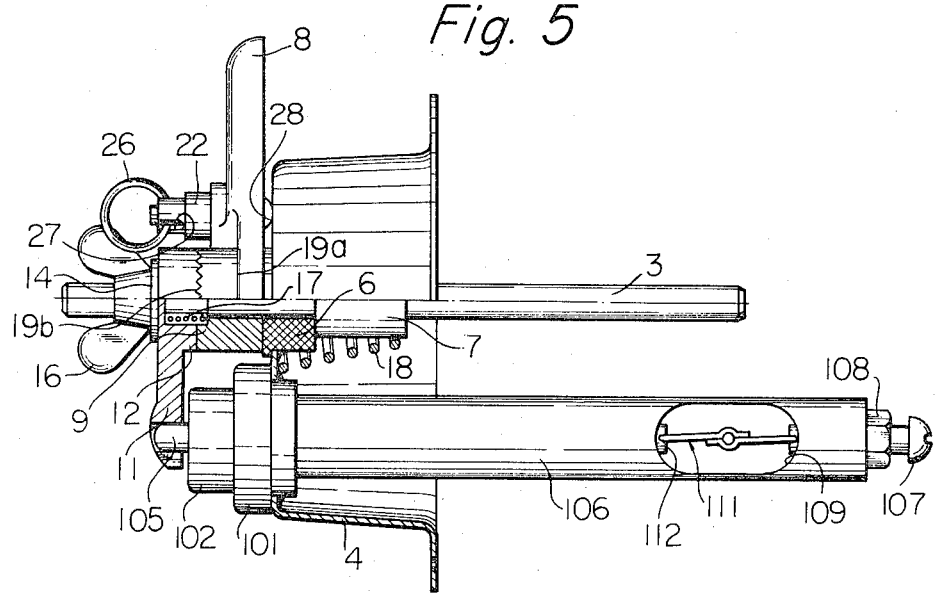
Figure 6:
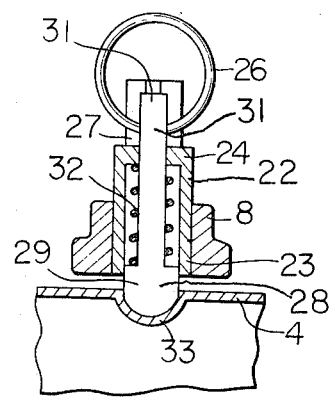

Further features and advantages of the art of the present invention will be more apparently understood from the ensuing description, reference being made to the accompanying drawings in which;

FIG. 1 is a longitudinal-sectional view of an embodiment of the damper device in accordance with the present invention, FIG. 2 is a longitudinal-sectional view of another embodiment of the same, FIG. 3 shows a perspective view of an embodiment of a duct arrangement provided with a fuse melt type apparatus including the damper device shown in FIG. 1, FIG. 4 is a plan view of the fuse melt type apparatus, FIG. 5 is a partly sectional view of the apparatus shown in FIG. 3, FIG. 6 is a vertical-sectional view of a locking member used in the apparatus shown in FIG. 3.

Referring to FIG. 1, there is provided a cylindrical holder 101 which is of a stepped form comprising a wider portion, an intermediate portion and a narrower portion. The holder includes a bore integral of a hole located in the wider portion thereof.

A cylinder 102 is threaded in the hole of the wider portion of the holder 101. A piston 103 consisting of a magnetic substance is inserted in the cylinder 102 in a slidable manner. The piston 103 has an annular projection 105 at the center of one end and a rod 104 which extends from the center of another side of coaxial arrangement aligned with the axis thereof. A head portion 104a is diverged and formed at the free end of the rod 104.

An annular casing 106 is secured to the narrower portion of the holder 101 at one threaded end and is provided with an adjusting bolt 107 threaded into a nut 108 fixed at the other end, and a pair of openings 109 near the other end is formed. A fusing member 111 is composed of a pair of plates 111a, 111b which are partially superposed and fixed to each other due to a fusible material. At the location of the opening the fusing member 111 is secured to a groove formed at an inner end of the adjusting bolt 107 in a detachable arrangement, Another end of the fusing member 111 is also detachably mounted onto a groove formed on a bottom end of a spring abutment 112 which is positioned in the annular casing 106 in a slidable and pivotable condition. The spring abutment 112 comprises a casing member 112a which accommodates a coiled spring 113 and a stopping member 112b having a diverged bore integral of an opening. The diverged bore corresponds to the head portion 104a of the rod 104. The stopping member 112b is threaded to the casing member 112a. The rod 104 extends into the annular casing 106 through the bore of the holder 101 and is inserted slidably into the spring abutment 112 through the opening of the stopping member 112b in an arrangement that the head portion 104a of the rod 104 is contained within the spring abutment 112. The head portion 104a is engageable with the corresponding bore of the stopping member 112b and is prevented from coming out of the spring abutment 112 by the stopping member 112b. The coiled spring 113, which is contained within the spring abutment, at one end is supported by the inner bottom wall of the spring abutment 112. The other end of the coiled spring 113 bears against the head portion 104a of the rod 104. In the arrangement, the coiled spring is sandwiched between the spring abutment 112 and the rod 104 and the spring abutment is rotatable within the annular casing 106 about the rod 104.

A compression spring 114 encircling the rod 104 is sandwiched by another end of the spring abutment 112 and the end of the narrower portion of the holder 101 bears against the spring abutment 112 which is mounted on the fusing member 111.

A solenoid 115, including a magnetic coil covered with an insulator and provided with a bore, is stationarily lodged within the cylinder 102 and the hole of the holder 101. Normally, the piston 103, slidable within the cylinder 102, is in the relative position departing from the solenoid 115 at its utmost extent, and the free end of the annular projection 105 is in position over the free end of the cylinder 102, while the head portion 104a of the rod 104 is engaged with the stopping member 112b of the spring abutment 112. The relative position of the annular projection 105 is adjustable by screwing the adjusting bolt 107 which is connected with the spring abutment 112 by means of the fusing member 111.

Upon melting of the fusible material at a predetermined temperature, the fuse member 111 is separated into the two plates. The restriction applied onto the compression spring 114 is cancelled and the compression spring is then expanded.

The spring abutment 112 is thus pushed towards the fuse member 111 or downwardly in the drawing due to the expansion of the compression spring 114. Simultaneously, the stopping member 112b of the spring abutment 112 pushes the head portion 104a of the rod 104 downwardly, while the coiled spring 113 in the spring abutment 112 is maintained in a stationary state. The annular projection 105 connected rigidly to the rod 104 by the piston 103 is thus withdrawn downwardly when the fuse member 111 is melted.

When the solenoid 115 is actuated, the piston 103 is drawn towards the solenoid or downwardly by magnetic force. Simultaneously the head portion 104a of the rod pushes the coiled spring 113 towards the bottom wall of the spring abutment 112 or downwardly and the coiled spring is thus compressed by the head portion 104a of the rod 104, while the compression spring 114 and the spring abutment 112 are maintained in stationary states.

Thus, the annular projection 105 is withdrawn upon actuating of the solenoid, while the fuse member 111 supports the spring abutment 112.

A modified embodiment in accordance with the present invention is shown in the sectional side elevation in FIG. 2. With reference to the drawing there is provided a casing 106' of annular form, at one end of which is attached an air cylinder 102' of a stepped form. The air cylinder 102' is provided with a smaller diametral bore portion at its end remote from the annular casing 106', which leads to a larger diametral bore portion therein. Slidable within the air cylinder 102' is a piston member which comprises an air piston 103', an annular projection 105' and a rod 104'. The projection 105' and the rod 104' extend oppositely to each other from the air piston 103' and their axes are aligned with that of the air piston 103'. The projection 105' is located slidably in the smaller diametral bore portion of the cylinder 102'. The air piston 103' is to be pushed by the air pressure and is withdrawn through the larger diametral portion of the air cylinder 102' downwardly in the drawing when the air is supplied through a feed passage 116 disposed in the air cylinder 102'. The feed passage 116 communicates with the diametral bore portion of the air cylinder and an inlet 117 disposed to the air cylinder 102'.

Formed in the casing 106' is a bore which accommodates a coiled spring 113' encircling the rod 104'. The coiled spring 113' at one end is supported by the air piston 103' and the other end of the spring 113' bears against a spring abutment 112'.

The spring abutment 112' is positioned in the bore of the casing 106', through an opening of a transverse wall 118 which is disposed to the casing 106' at the intermediate position and separates the bore of the casing into two portions. The spring abutment 112' is mounted detachably upon a fuse member 111' which is located within openings 109' of the casing. The openings 109' are located in the side wall between the free end and the transverse wall 118 of the casing. At the other end, the fuse member 111' is engaged to an adjusting bolt 107' threaded to the free end of the casing 106'. The free end of the casing is a nut 108' secured to the casing.

The spring abutment 112' comprises a casing member 112a and a stopping member 112b' threaded thereinto. The bore of the casing member 112a', which terminates at the end wall, is larger than a bore formed in the stopping member 112b' in diameter and the former communicates with the latter. The rod 104' is inserted in the spring abutment 112' through the bore of the stopping member 112b'. Formed at the free end of the rod 104' is an enlarged head portion 104a' which is accommodated in the spring abutment 112' and is slidable in the bore of the casing member 112a'. The stopping member 112b' thus prevents the head portion 104a' of the rod 104' from coming out of the spring abutment 112'.

Another compression spring 114', encircling both the rod 104' and the coiled spring 113' is sandwiched by the air cylinder 102' at the inner end thereof and the spring abutment 112' at the shoulder thereof.

In a normal state of the device in the above-described arrangement, the annular projection 105' is projected outside from the air cylinder 102' through the smaller diametral bore thereof. Upon melting of the fusible material, the support applied onto the spring abutment by the fuse member 111' is cancelled and then the spring abutment 112' is drawn towards the fuse member 111' or downwardly in the drawing due to the repulsion of the compression spring 114'. However, the relative position among the spring abutment 112', the piston members 103', 104', 105' and the coiled spring 113' is maintained in a stationary position. The piston member thus is withdrawn by the spring abutment 112' towards the fuse member 111' or downwardly.

Upon supplying of the pressure air through the feed passage 116 of the head by actuation of the air pressure apparatus (not shown) while the spring abutment is supported by the fuse member 111', the piston 103' is pushed downwardly due to the pressure of the fluid. The rod 104' thus slides within the spring abutment 112' towards the bottom end thereof bearing against the coiled spring 113' and the coiled spring 113' is then compressed. However, the relative positions between the fuse member 111', the spring abutment 112' and the compression spring 114' are maintained stationary. Upon stopping of the actuation of the air pressure apparatus, the device is restored to the original state, that is, the normal state, due to the expansion of the coiled spring 113'.

In the device, the piston may be urged towards the fuse member by pressure oil or other pressure medium instead of air.

The device of the kind specified in accordance with the present invention can be applied to, for example, the following fuse melt-type apparatus for intercepting and controlling flow medium through a conduit duct, illustrated in FIGS. 3, 4, 5 and 6.

Referring to FIG. 3 a damper frame 1, which is encircled by a side wall of a duct, is provided with a transverse cross-sectional profile compatible with a transverse cross-sectional profile of the duct and is disposed in an arrangement transversing the duct. A butterfly damper 2 is pivotally disposed to the side wall of the damper frame 1 in an arrangement axially mounted onto a damper shaft 3 elongated through the wall of the damper frame 1.

Referring to FIGS. 4 and 5, a casing 4 to be secured to the side wall of the damper frame 1, as shown in FIGS. 1 and 2, is provided with a bearing 6 disposed to a bottom wall thereof. The damper shaft 3 is provided with an enlarged diametral portion 7 and is supported by the bearing 6 at the enlarged diametral portion. A hand operable handle 8 is secured to an outside of the damper shaft 3, which extends outside the bottom wall of the casing 4 by a boss 9, in an arrangement that the bearing 6 is sandwiched by the enlarged diametral portion 7 of the damper shaft 3 and the boss 9 of the hand operable handle 8. A damper arm 11 is also pivotally mounted onto the outside extension of the damper shaft 3 by its boss 12 and a compression spring 17 encircling the damper shaft 3 is disposed between the boss 9 and the boss 12. Further, a wing nut 16 is mounted on the outside extension of the damper shaft 3 by a washer 14 so as to clamp the arm 11 against the handle 8 by the compression spring 17. A helical spring 18 encircling the damper shaft 3 is disposed within the casing 4 with one end thereof being secured to an inside surface of the bottom wall of the casing 4 and another end thereof being secured to the enlarged diametral portion 7 of the damper shaft 3. A pair of facing surfaces of the damper arm 11 and the handle 8 are provided with radially formed teeth 19a, 19b which are mutually compatible. That is, the teeth 19a, 19b extend radially from a common central axis to the peripheral fringes of the bosses 9 and 12, respectively. A free end of the damper 11 branches, forming a curved portion 21 receptive of the annular projection 105 of the damper device according to the invention.

Referring to FIG. 6, the hand operable handle 8 is provided, at its stem portion, with a cylindrical protuberance 22 having a bore portion 23 of an enlarged diameter and a bore portion 24 of a small diameter integral of the bore portion 23. A small diametral portion 24 of the cylindrical protuberance 22 branches, forming a groove 27 receptive of a ring 26. An annular locking member 28 is composed of a large diametral portion 29, which corresponds to the internal diameter of the cylindrical protuberance 22, and a small diametral portion 31. The annular locking member 28 is inserted into the cylindrical protuberance 22 by a spring 32 in a pivotal and slidable arrangement. The small diametral portion 31 of the locking member 28 is provided with a ring 26 encircling the locking member 28 and the freedom of the sliding motion of the locking member 28 through the cylindrical protuberance 22 is restricted by the mechanical relationship between the ring 26 and the groove 27. The bottom wall of the casing 4 is provided with a recess 33 receptive of the large diametral portion 29 of the locking member 28 and formed at a location corresponding to the angular location of the damper shaft 3 at the complete closing of the damper 2.

Referring to FIG. 4, the damper device illustrated in FIG. 1, is to be inserted into the damper frame 1 through the side wall of the damper frame 1 in an arrangement so as not to bar a prescribed pivotation of the damper such as shown in FIG. 3 through the bottom wall of the casing 4 by the threaded portion of the holder 101. The annular projection 105 is located at a position detachable from the curved portion 21 of the damper arm 11.

The operational feature of the fuse-melt type apparatus having the aforementioned mechanical design is as follows.

By loosening the wing-nut 16, the damper arm 11 is urged by the expansion of the compression spring 17 inserted between the damper arm 11 and the hand operable handle 8. Both bosses 9 and 12 are spaced apart and the engagement of the damper arm 11 with the handle 8 is cancelled. Therefore, in this cancelled condition, either of the two members can be freely and easily pivoted by application of manual operation independently from one another. The locational relationship of the annular projection 105 within the device can be adjusted by operating the adjusting bolt 107. The magnitude of the opening of the damper 2 can be selected as desired by applying a pivoting operation on the hand operable handle 8. As shown in FIG. 4 engagement between the damper arm 11 and the handle 8 can be achieved by fastening the wing-nut 16 so as to put the teethed surfaces of the bosses 9 and 12 in a pressure engagement. By connecting the handle 8 in an adequately selected angular location with the damper arm 11, which is in engagement with the angular projection 105 of the damper device through fastening of the wing-nut 16, the damper 2 is settled at an opening magnitude corresponding to the selected angular location of the handle 8. In a condition where the ring 26 is inserted into the groove 27 of the protuberance, the locking member 28 is urged against the bottom wall of the casing 4 by the compression spring 32 such as shown in FIG. 4. However, when the ring 26 is brought into an arrangement crossing the groove 27, the locking member 28 is released from this urged condition.

In the initial setting of the apparatus, the damper 2 should be set to a fully closed condition, that is, the damper 2 should be put in a condition perpendicular to the advancing direction of the flow through the duct, with the hand operable handle 8 being put in an angular location designated as "S" on the bottom wall of the casing 4 as shown in FIG. 3, whereon the recess 33 is located. The damper 2 may be set to the fully opened condition, that is, the damper 2 should be put in a condition parallel to the advancing direction of the flow through the duct with the hand operable handle 8 being put in an angular location designated as "O" on the bottom wall of the casing 4. By thusly setting the arrangement, the opening of the damper can be selected as desired by referring to the dial from "O" to "S".

Upon passing of an abnormally overheated medium through the duct, in the damper device the fuse member 111, which is in an arrangement exposed to the flow of the medium through the opening 109 of the annular casing 106, is partially molten and the two plates 111a, 111b are separated due to melting of the fusible material. With this separation of the two plates, the restriction applied onto the compression spring 114 is cancelled and then the slidable abutment 112 is urged so as to draw the rod 104, because the head portion 104a of the rod 104 is engaged with the stopping member in an arrangement prevented from disengaging from the spring abutment 112. The piston 103 and the annular projection 105 are thus withdrawn following the rod 104 as well as the spring abutment 112. By this withdrawal of the annular projection 105 into the annular casing, 106, the connection between the annular projection 105 and the curved portion 21 of the damper arm 11 is cancelled. Upon this cancellation of the connection, the damper 2, which is urged by the helical spring 18 so as to pivot to the angular location corresponding to the complete closing thereof, performs a pivotation together with the damper arm 11 and the handle 8 for intercepting the flow of the overheated medium. Simultaneously with this pivotation of the damper 2, the locking member 28, which is urged by the spring 32, is received into the recess 33 such as shown in FIG. 6, which is formed on the bottom wall of the casing 4 at the location corresponding to the closing of the damper 2. By this reception of the locking member 28, a restriction is effected on the handle 8 and damper 12, which forms one body with the handle 8, is maintained at the location corresponding to the closing of the damper 2.

Owing to the aforementioned closing of the damper, accidental passing of the overheated medium flow can be intercepted effectively and fire accident caused by the passing of the overheated medium flow can be perfectly prevented.

Further, in the setting of the apparatus at a desirable opening magnitude of the damper, the closing of the damper 2 is attainable due to the actuation of the solenoid 115 of the damper device at any time. The actuation of the solenoid can be operated from a remote control center by turning on the switch of the electric source connected to the solenoid 115 through the electric cord in the well-known arrangement (not shown).

Upon actuating the solenoid 115, it changes in its magnetic state and then the piston 103 is drawn downwardly towards the solenoid 115 in the cylinder with the annular projection 105 and the rod 104 by the magnetic force, while compressing the coiled spring in the spring abutment. The connection of the annular projection of the damper device with the curved portion of the damper arm is thus cancelled, and then the damper performs the pivotation to intercept the medium flow in the above-described manner of the apparatus.

While the piston is drawn towards the solenoid, the spring abutment supported by the fusing member is in a stationary position and only the coiled spring changes in a compressed state due to pushing of the rod 104. Therefore, the damper device is restored to its original state by the expansion of the coiled spring 114 when the electric switch is shut off. The damper device of the present invention is thus capable of applying the closing of the damper upon the instruction from the remote control center, while maintaining a function of an automatic interception of the flow through detection of overheating of the medium.

What is claimed is:

1. In a butterfly damper arrangement having a damper shaft extending into a duct through a duct wall in an axially pivotal disposition, a damper arm radially extending outside of said duct from said damper shaft and means for urging said damper shaft towards a pivotal angular position for closing said damper, an improved fuse melt type device, comprising, in combination; a fusible structure, one end of which is secured to an element slidably mounted in an internal extension of a stepped form from said duct wall with said fusible structure being exposed to a flow medium, the other end of said fusible structure being secured to said internal extension; said slidable element comprising a spring abutment having an axial bore having only one opening at one end and inserted slidably within said internal extension, the other end of said spring abutment being closed and providing said securement to said one end of said fusible structure; a piston member of a stepped form and slidably mounted within said internal extension and extending at one end through said duct wall, the other end of which is inserted slidably in said bore for engagement with said spring abutment through said opening, said bore of said spring abutment being larger than said opening of said spring abutment in diameter and said other end of said piston member also being larger than said opening of said spring abutment whereby said piston member is prevented from disengaging from said spring abutment, said one end of said piston member extending through said duct wall to have a detachable connection with said arm holding said damper arm in a preselected valving position; first resilient means for urging said piston member remotely away from said fusible structure; means for urging said piston member towards said fusible structure against said urging force by said first resilient means upon instruction from a given remote control center to thereby release said detachable connection with said damper arm so that said damper shaft is moved to the closed position; and second resilient means for urging said spring abutment together with said piston member towards said fusible structure, said fusible structure normally blocking movement of said spring abutment within a temperature range different from said predetermined temperature condition against the bias of said second resilient means, and upon the melting of said fusible structure releasing said spring abutment for movement together with said piston member to release said detachable connection with said damper arm so that said shaft is moved to the closed position.

2. An improved device claimed in claim 1, wherein said first resilient means is a coiled spring in an arrangement sandwiched between said spring abutment and said piston member.

3. An improved device claimed in claim 1, wherein said second resilient means is a compression spring encircling said piston member in an arrangement sandwiched between said internal extension and said spring abutment within said internal extension.

4. An improved device claimed in claim 1, wherein said urging means upon said instruction includes a solenoid disposed within said internal extension encircling said piston member.

5. An improved device claimed in claim 1, wherein said urging means upon said instruction includes a pressure fluid medium supplied into said internal extension towards said fusible structure against said piston member.

6. An improved device claimed in claim 1, wherein said internal extension from said duct wall is detachable therefrom.

7. An improved device claimed in claim 2, wherein said coiled spring is accommodated in said bore of said spring abutment.

8. An improved device claimed in claim 2, wherein said coiled spring is positioned outside of said spring abutment, encircling said piston member.

* * * * *